Patented May 29, 1951

2,554,625

UNITED STATES PATENT OFFICE 2,554,625

PROCESS OF CANNING SEAFOOD AND RESULTANT PRODUCT

Earl P. McFee, Gloucester, and John A. Peters, Rockport, Mass., assignors to Gorton-Pew Fisheries Company, Ltd., Gloucester, Mass., a corporation of Massachusetts No Drawing. Application November 10, 1949, Serial No. 126,678

19 Claims. (Cl. 99—188)

This invention relates to the treatment of seafood and more particularly to its treatment to prevent the formation of struvite crystals when canned.

It is well known that canned cooked shell fish, such as lobsters, shrimp and crabmeat, as well as canned fish, such as haddock, cod, and other members of the Gadidae family as well as such fish as salmon, etc., develop upon standing, transparent crystals known as struvite. Fish having a high oil content, or fish canned in oil, such as tuna, mackerel or the like, have less of a tendency to form these crystals but struvite crystals are known in all types of fish. While not harmful, either chemically or physically, struvite crystals do resemble glass and, when present, render canned seafood unfit to eat in the opinion of many people.

Struvite chemically is hydrated magnesium ammonium phosphate with the theoretical chemical formula $Mg(NH_4)(PO_4)6H_2O$ and it is crystals of this composition that slowly form in canned seafood upon standing, usually most noticeably on the inside surface of the can and on the surface of the meat. The amount of magnesium ions, ammonium ions and phosphate ions in the flesh of the seafood and in the surrounding fluid or juice varies considerably with the type of seafood and the method of canning it, but is generally sufficient to form struvite crystals.

It is the object, therefore, of this invention to prevent the formation of struvite crystals in canned seafood, and particularly in members of the Gadidae family, salmon and shell fish.

Another object is to prevent the formation of struvite crystals in canned seafood by removing magnesium compounds from the seafood by washing it.

These and other objects which will become apparent may be attained by treating fish and shell fish with a magnesium solubilizing agent, and removing the solubilized magnesium by draining and/or washing. Solubilizing materials include acids, such as citric, hydrochloric and acetic, and include sequestering agents such as alkali metal metaphosphates, such as sodium acid pyrophosphate and amino polycarboxylic acid compounds such as ethylene diamine tetraacetic acid.

Originally the magnesium compounds are present in the flesh of the seafood. Mere rinsing, washing, or boiling the seafood in water, or attempting to extract the magnesium compounds with water in any other way is not a successful or practical method since insufficient magnesium compounds are solubilized by the water. It has been found, however, that if the seafood is treated in two or three times its weight of water having a pH of 5.0 or below by means of the addition of any suitable acid, the magnesium compounds may be leached out and solubilized and removed with one treatment; similarly sequestering agents also solubilize the magnesium compounds. A procedure involving repeated treatment with small amounts of water may also be followed if desired. When sufficient magnesium compounds have been removed from the seafood, the liquid is drained off and fresh water is added if desired. To bring the pH of the seafood back to neutral a small amount of alkali, such as sodium carbonate or sodium hydroxide, may be added after the acid wash has been drained off.

Struvite is formed in canned seafood by the development of crystals from a super-saturated solution of struvite-forming ions in the juice. It has been found that in order to prevent the formation of struvite crystals, it is necessary to remove sufficient magnesium compounds from the seafood so that at no time during storage of the canned product can a super-saturation of magnesium ions build up. Such super-saturation exists in most seafood juices, such as haddock, pollock and the like when it is present in an amount in excess of about 0.015% by weight of the normal pack, i. e. one which contains about 80% water, and 20% solids, or about the same ratio of water to dry solids as exists in the live fish, lobster, etc. Sufficient magnesium compounds may be removed in a one-step process by treating the seafood with about 2 to 3 times its weight of acidified water at a pH of at least as low as 5.0 followed by draining off the acid. The solubilized magnesium compounds are then removed by draining the water and rinsing the cooked material. If a metaphosphate is used in place of the acid, from ½ to 2% by weight of the salt is employed and if an amino polyacetic acid is used, from ¼ to 1½% by weight is employed. Of course higher concentrations can be used, but this will not be necessary and not desirable from economic considerations. As in the case of the acid, the seafood is treated with 2 to 3 times its weight of water from 5 to 15 minutes, drained and rinsed.

The magnesium compound content must be lower than that giving an equivalent magnesium content of 0.015% and preferably less than 0.01% by weight based on the water content. To bring the magnesium content to this level it is necessary to remove at least about 25% originally present and, because the magnesium content is higher in some varieties and types of seafood than in others, it is best to remove about 50% of the magnesium compounds. As stated above this may be accomplished simply by treating the seafood with water in the presence of a solubilizing agent, and draining the liquid from the seafood.

Various methods of treating the seafood may be employed, some of which are more efficient than others in removing magnesium salts from the flesh of the seafood. Comminuting raw fish to a fine mass contributes considerably to the removal and is particularly effective when the solubilizing agent is added to the raw ground fish. If the solubilizing agent and comminuted fish are boiled together, a further advantage is obtained. And if the time of contact with the solubilizing agent is continued for long periods of time, a further advantage is secured. Repeated treatment will also remove additional magnesium compounds. While as stated above, it is necessary to remove in most instances only about 25% of the magnesium compounds present, up to about 97% may be removed by the method of the above described processes by following the most efficient procedure. As indicated above, the concentration of magnesium ions should not exceed a concentration of 0.015% of the water present in the pack. When fish is packed quite dry, as in flaked fish and other types, it is necessary to remove a higher percentage of the magnesium compounds present than is the case in a normal canning operation. In this way the critical concentration of 0.015% is not exceeded. As certain varieties of fish contain a higher percentage of magnesium compounds, and for other reasons, more than the minimum removal of magnesium is advisable as a general practice.

The metaphosphate may be any one of the alkali metaphosphates such as sodium hexametaphosphate, ammonium metaphosphate, sodium tripolyphosphate, or the potassium equivalent of these products.

The amino polyacetic acid may be represented by the formula:

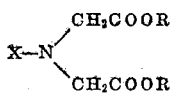

wherein R may be hydrogen or an alkali metal such as ammonium, sodium, potassium or lithium, and X may be

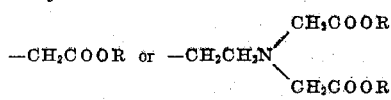

If desired, a mixture of the metaphosphate and amino polyacetic acid may be employed.

In order to illustrate and to contribute to the understanding of our invention the following examples are submitted:

*Example I*

The following illustrates the use of hydrochloric acid as a solubilizing agent in cooked fish:

To 600 grams of codfish, cooked for 10 minutes at 15 pounds' pressure, and picked free of bones, were added 1200 ml. of water and 10 ml. of concentrated hydrochloric acid. The pH of the fish was 4.85. After the fish had been stirred for 15 minutes, the liquid was separated by a basket centrifuge (liquid called acid wash).

Water was added to make the total weight 1800 grams, stirred 15 minutes, and again centrifuged (liquid called water wash). The treated product was again made up to 1800 grams with water, the mixture neutralized with sodium hydroxide to pH 7.0, stirred and filtered (liquid called neutral wash). The last step was again repeated. An analysis disclosed 65% of the original magnesium content present in the acid wash, 30% in the water wash and none in either of the neutral washes.

*Example II*

The following illustrates the use of acetic acid as the solubilizing agent:

After cooking codfish in twice its weight of water, the excess liquid was drained off, and fresh water was added. To this mixture acetic acid was incorporated until a pH of 5.0 was obtained. The mixture was stirred and the acid solution drained off.

The magnesium content was reduced by 61% by the above procedure.

*Example III*

The following illustrates the treatment of raw ground fish with acid:

Raw codfish was put through a meat grinder, twice the weight of water added, and sufficient acetic acid to reduce the pH to 5.0. The mixture was stirred for a few minutes, the acid drained off, fresh water added and the fish cooked. The magnesium content was reduced 76%.

*Example IV*

Following the same procedure as in Example III, except that the fish was drained after cooking, 96.0% of the magnesium content was removed.

*Example V*

That the acid treatment need not be on the raw fish to obtain a high removal of magneisum compounds is illustrated by the following:

Ground raw fish, cooked in water, drained, stirred at pH 5.0, drained, stirred in water and drained showed a percentage loss of magnesium content equal to 94.0%.

*Example VI*

100 grams of ground, raw codfish were cooked in 200 grams of a 2% Calgon solution for about 10 minutes. The juice was drained hot, removing about 60% of the magnesium content thereby.

*Example VII*

100 grams of ground, raw codfish were cooked in 200 grams of a 2% solution of a compound having the formula:

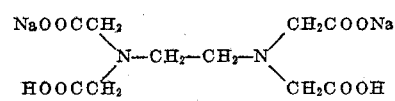

The juice was drained hot and about 50% of the magnesium content was removed thereby.

It is evident from the above examples that magnesium compounds may be readily removed in sufficient quantity to prevent struvite formation with the use of a solubilizing agent.

We claim:

1. Canned seafood free from struvite crystals and having a substantially less magnesium content than is normally present in said seafood and having a pH about neutral.

2. Canned seafood free from struvite crystals and containing at least 25% less magnesium content than is normally present in said seafood and having a pH about neutral.

3. Canned seafood containing not more than 0.015% by weight of magnesium in magnesium compounds based on the total water content and having a pH about neutral.

4. Canned seafood containing not more than 0.010% by weight of magnesium in magnesium compounds based on the total water content and having a pH about neutral.

5. Canned fish containing not more than 0.010% by weight of magnesium in magnesium compounds based upon the total water content and having a pH about neutral.

6. The product in accordance with claim 5 wherein the fish is a member of the Gadidae family and having a pH about neutral.

7. The product in accordance with claim 5 wherein the fish is salmon and having a pH about neutral.

8. Canned fish containing not more than 0.015% by weight of magnesium in magnesium compounds based on the total water content and having a pH about neutral.

9. The process for preventing the formation of struvite crystals in canned seafood which comprises thoroughly contacting said seafood with a magnesium solubilizing agent, draining the solubilizing agent from said seafood, adding alkali to bring the pH to about 7, and canning said seafood.

10. The process for preventing the formation of struvite crystals in canned seafood which comprises adding to the seafood an aqueous solution of a sequestering agent, thoroughly contacting said seafood with said agent, draining the liquid from said seafood, adding alkali to bring the pH to about 7, and canning said seafood.

11. The process in accordance with claim 10 wherein said sequestering agent is an alkali metaphosphate and is present in an amount equal to at least about ½% by weight.

12. The process in accordance with claim 10 wherein said sequestering agent is an amino polyacetic acid compound having the formula:

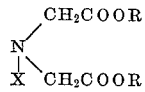

wherein X is a member of the group consisting of —CH₂COOR, and

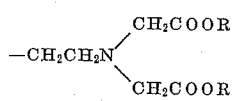

and wherein R is a member of the group consisting of H, Na, K, Li, and NH₄, said amino polyacetic acid compound being present in an amount equal to at least ¼% by weight.

13. The process in accordance with claim 12 wherein the amino polyacetic acid compound is

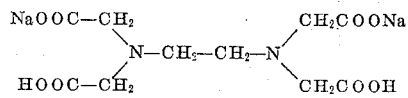

14. The process in accordance with claim 16 wherein the acid is citric acid.

15. The process in accordance with claim 16 wherein the acid is hydrochloric acid.

16. The process for preventing the formation of struvite crystals in canned seafood which comprises adding to the seafood at least twice its weight of an aqueous solution of an acid to the extent that the pH of the mixture is not more than 5.0, thoroughly contacting said seafood with said acid, draining the liquid from said seafood, neutralizing the seafood with an alkali solution, and canning said seafood.

17. The process for preventing the formation of struvite crystals in canned fish which comprises adding to said fish an acid to the extent that the pH of the mixture is not more than 5.0, thoroughly contacting said fish with said acid, draining the liquid from said fish, adding alkali to bring the pH to about 7, and canning the fish.

18. The process in accordance with claim 17 wherein said fish is a member of the Gadidae family.

19. The process in accordance with claim 17 wherein said fish is salmon.

EARL P. McFEE.
JOHN A. PETERS.

REFERENCES CITED

The following references are of record in the file of this patent:

UNITED STATES PATENTS

| Number | Name | Date |
| --- | --- | --- |
| 2,088,831 | Ash | Aug. 3, 1937 |
| 2,381,019 | Webb | Aug. 7, 1945 |

OTHER REFERENCES

"Chemical Abstracts," vol. 36, page 71659, article entitled "Struvite in Canned Fish Products," by R. T. Merwin.

"The Properties and Uses of Ethylenediamine Tetra Acetic Acid and its Salts," published by Berwerth Chemical Co.

"The Modern Chelating Agent," Technical Bulletin #1, published by Berwerth Chemical Co.